(12) United States Patent
Breen

(10) Patent No.: US 7,878,236 B1
(45) Date of Patent: Feb. 1, 2011

(54) CONSERVING ENERGY IN AN HVAC SYSTEM

(76) Inventor: Joseph G. Breen, 575 Echo Glen Ave., River Vale, NJ (US) 07675

(*) Notice: Subject to any disclaimer, the term of this patent is extended or adjusted under 35 U.S.C. 154(b) by 165 days.

(21) Appl. No.: 12/367,816

(22) Filed: Feb. 9, 2009

(51) Int. Cl.
*F24F 7/007* (2006.01)
*F24F 7/08* (2006.01)

(52) U.S. Cl. .......... 165/288; 165/297; 165/47; 165/54; 165/59; 165/66; 165/85; 165/909; 290/55

(58) Field of Classification Search ........... 165/47, 165/54, 909, 85, 66, 287, 288, 297, 59; 29/54, 29/55
See application file for complete search history.

(56) References Cited

U.S. PATENT DOCUMENTS

| | | | |
|---|---|---|---|
| 3,067,590 A | 12/1962 | Wood, Jr. | |
| 3,494,415 A | 2/1970 | McNabney | |
| 3,666,007 A | 5/1972 | Yoshino et al. | |
| 3,968,833 A | 7/1976 | Strindehag et al. | |
| 4,057,465 A | 11/1977 | Thompson et al. | |
| 4,142,575 A | 3/1979 | Glancy | |
| 4,148,293 A | 4/1979 | Lents et al. | |
| 4,188,994 A * | 2/1980 | Hinshaw | 165/61 |
| 4,252,181 A * | 2/1981 | Kirchmeier | 165/7 |
| 4,431,048 A | 2/1984 | Mori et al. | |
| 4,481,783 A | 11/1984 | Pecz et al. | |
| 4,513,809 A | 4/1985 | Schneider et al. | |
| 4,742,957 A | 5/1988 | Mentuch | |
| 5,512,788 A * | 4/1996 | Berenda et al. | 290/55 |
| 5,573,058 A * | 11/1996 | Rolin | 165/210 |
| 5,878,808 A * | 3/1999 | Rock et al. | 165/85 |
| 6,119,767 A * | 9/2000 | Kadota et al. | 165/104.33 |
| 6,209,622 B1 | 4/2001 | Lagace et al. | |
| 6,365,985 B1* | 4/2002 | Cohen | 290/55 |
| 6,798,657 B1* | 9/2004 | Clifton et al. | 361/691 |
| 7,177,151 B2* | 2/2007 | Van Lear et al. | 361/696 |
| 7,200,005 B2* | 4/2007 | Von Gutfeld et al. | 361/695 |
| 7,287,381 B1 | 10/2007 | Pierson et al. | |
| 7,748,947 B2* | 7/2010 | Caldwell | 415/4.1 |

FOREIGN PATENT DOCUMENTS

| | | | |
|---|---|---|---|
| FR | 2588364 A1 * | 4/1987 | |
| JP | 57153133 A * | 9/1982 | |
| JP | 2005308328 A * | 11/2005 | |

* cited by examiner

*Primary Examiner*—John K Ford
(74) *Attorney, Agent, or Firm*—Arthur Jacob

(57) ABSTRACT

In an HVAC system in which ambient air is supplied by the system to a building through an ambient air intake airstream and is exhausted from the building through an exhaust airstream energy is conserved by transferring heat between the intake airstream and the exhaust airstream. A heat exchange fluid is circulated between heat exchangers located in the intake airstream and in the exhaust airstream. An air turbine is placed in the exhaust airstream for being driven by the exhaust airstream, and the air turbine is coupled with a pump arranged to circulate the heat exchange fluid between the heat exchangers such that upon being driven by the exhaust airstream, the air turbine, in turn, drives the pump to circulate the heat exchange fluid between the heat exchangers and thereby effects the transfer of heat from one to the other of the intake airstream and the exhaust airstream and a concomitant conservation of energy in the HVAC system.

15 Claims, 3 Drawing Sheets

CONSERVING ENERGY IN AN HVAC SYSTEM

The present invention relates generally to HVAC systems and pertains, more specifically, to improvements for enabling the conservation of energy in the operation of such HVAC systems.

HVAC systems are used extensively to accomplish one or more of the functions of heating, ventilating and air conditioning buildings; hence, the designation "HVAC" identifies a system which is installed in a building to provide the building with either heat, ventilation or air conditioning, or any combination of these functions. Because HVAC systems are so ubiquitous and usually are in continuous operation in so many buildings, a great deal of energy use is dedicated to the operation of HVAC systems. Accordingly, improvements which can accomplish the conservation of energy in the operation of HVAC systems continually are being sought. Even the conservation of relatively small amounts of energy in the operation of a single HVAC system can be significant when viewed in the light of the multitude of HVAC systems in use.

In general, HVAC systems are designed not only to circulate air throughout a building, while providing heating, cooling or ventilation, but to exchange and replenish air within the building with ambient air from outside the building. Because of temperature differences which usually exist between the air circulated within a building and ambient air outside the building, ambient air taken into an HVAC system usually is heated or cooled by the system before being introduced into the building, and air exhausted from the building usually is warmer or cooler than the ambient air outside the building. It has been suggested that energy can be conserved by the transfer of heat between ambient air being taken into a building and air being exhausted from the building to reduce the energy input into an HVAC system required to raise or lower the temperature of incoming air, by the amount of energy transferred from the exhaust air to the incoming air. Systems have been offered in which a heat exchange fluid is circulated by a fluid pump through heat exchangers located in an incoming airstream and in an exhaust airstream to effect the desired transfer of heat, thereby effecting "pre-cooling" of incoming air when the ambient air temperature is higher than desired and is to be cooled by the HVAC system, or "pre-heating" of incoming air when the ambient air temperature is lower than desired and is to be heated by the HVAC system. However, these systems are quite elaborate, requiring extensive plumbing, pumps and control systems which are best provided as original equipment in new installations and are not amenable to retrofitting the many HVAC systems already in use.

The present invention provides improvements which accomplish the objective of conservation of energy in the operation of HVAC systems, as outlined above, with simplified modifications readily adapted to existing HVAC systems, as well as to new HVAC systems. As such, the present invention attains several objects and advantages, some of which are summarized as follows: Provides improvements in both apparatus and method for conserving energy in the operation of an HVAC system; conserves energy in an HVAC system in which air is supplied by the system to a building through an ambient air intake airstream and is exhausted from the building through an exhaust airstream; enables a simplified installation of the several components of an improvement to an HVAC system for accomplishing energy conservation in either an existing, installed HVAC system or a new HVAC system; provides apparatus and method for modifying an HVAC system to conserve energy during operation of the HVAC system, without the necessity for extensive plumbing and electrical connections in order to complete an effective modification; accomplishes simplified, more efficient modes of operation of an HVAC system adapted to conserve energy during such operation; requires less complex, readily installed components for the modification of an HVAC system to attain conservation of energy during operation of the system; provides improvements which attain energy conservation with reliable operation over an extended service life.

The above objects and advantages, as well as further objects and advantages, are attained by the present invention, which may be described briefly as an improvement for conserving energy in an HVAC system in which ambient air is supplied by the system to a building through an ambient air intake airstream and is exhausted from the building through an exhaust airstream, and heat is transferred between the intake airstream and the exhaust airstream by a heat exchange fluid circulated through a fluid circuit by a heat exchange fluid pump between an intake air heat exchanger located in the intake airstream and an exhaust air heat exchanger located in the exhaust airstream, the improvement comprising: an air turbine placed in one of the intake airstream and the exhaust airstream for being driven by a corresponding airstream, the air turbine being coupled with the heat exchange fluid pump such that upon being driven by the corresponding airstream, the air turbine will, in turn, drive the heat exchange fluid pump to circulate the heat exchange fluid between the intake air heat exchanger and the exhaust air heat exchanger and thereby effect the transfer of heat from one to the other of the intake airstream and the exhaust airstream and a concomitant conservation of energy in the HVAC system.

In addition, the present invention provides a method for conserving energy in an HVAC system in which ambient air is supplied by the system to a building through an ambient air intake airstream and is exhausted from the building through an exhaust airstream, and heat is transferred between the intake airstream and the exhaust airstream by a heat exchange fluid circulated through a fluid circuit by a heat exchange fluid pump between an intake air heat exchanger located in the intake airstream and an exhaust air heat exchanger located in the exhaust airstream, the method comprising: placing an air turbine in one of the intake airstream and the exhaust airstream for being driven by a corresponding airstream; and coupling the air turbine with the heat exchange fluid pump such that upon being driven by the corresponding airstream, the air turbine will, in turn, drive the heat exchange fluid pump to circulate the heat exchange fluid between the intake air heat exchanger and the exhaust air heat exchanger and thereby effect the transfer of heat from one to the other of the intake airstream and the exhaust airstream and a concomitant conservation of energy in the HVAC system.

The invention will be understood more fully, while still further objects and advantages will become apparent, in the following detailed description of preferred embodiments of the invention illustrated in the accompanying drawing, in which.

Figure 1:
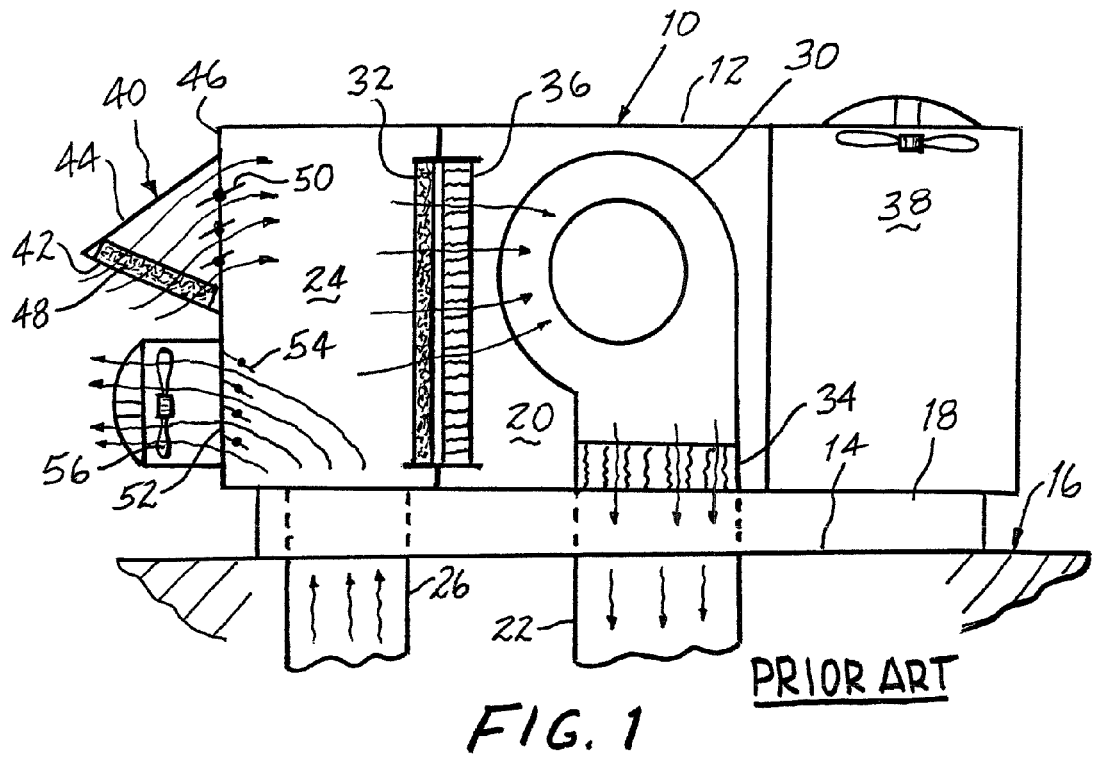
FIG. 1 is a largely diagrammatic side elevational cross-sectional view of a conventional HVAC unit installed in a building HVAC system.
Figure 2:
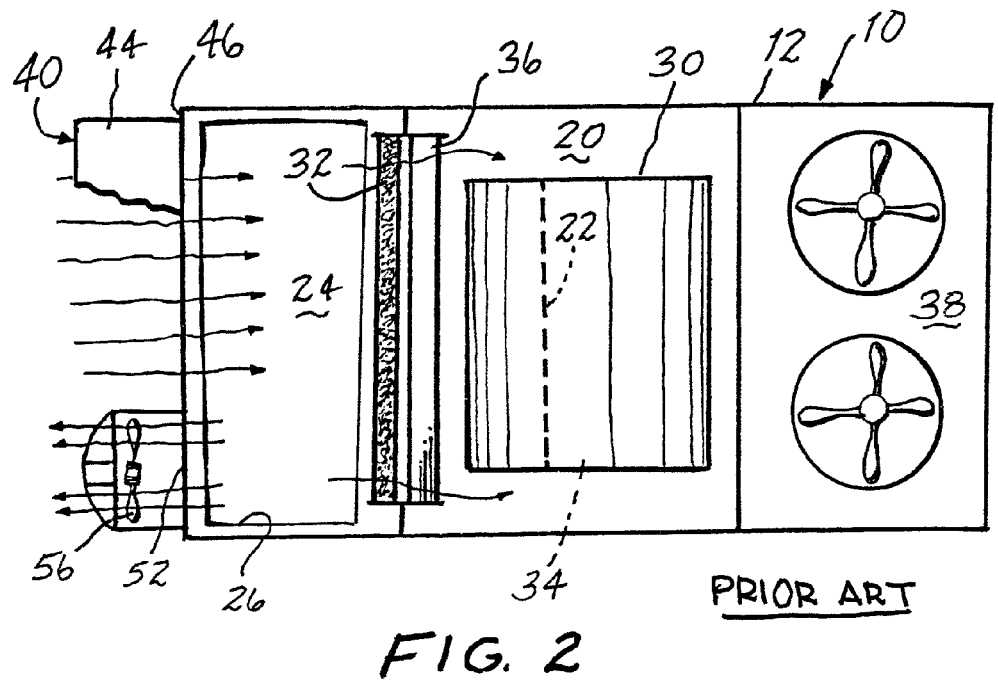
FIG. 2 is a largely diagrammatic cross-sectional top plan view of the HVAC unit of FIG. 1.

Referring now to the drawing, and especially to FIGS. 1 and 2, an HVAC system 10 includes a conventional HVAC unit 12 installed on the roof 14 of a building 16, the HVAC unit 12 being mounted upon an insulated roof curb 18 as is typical in the installation of HVAC systems. HVAC unit 12 includes a supply section 20 which communicates with a supply duct 22 of HVAC system 10, and a return section 24 which communicates with a return duct 26 of the HVAC system 10, the supply duct 22 and the return duct 26 extending into the building 16 for circulating processed air through the building 16. During ordinary operation, a blower 30 in the supply section 20 draws air from the return section 24, through an air filter 32, and directs filtered air to the supply duct 22.

When operated in a heating cycle, HVAC unit 12 furnishes heated air to the supply duct 22. To that end, heat is supplied to a heat exchanger 34 interposed between the blower 30 and the supply duct 22 so that air furnished to the supply duct 22 is heated as the air passes through heat exchanger 34 to the supply duct 22. During a cooling cycle, a refrigerant is supplied to an evaporator 36 interposed between the return section 24 and the supply section 20 so that air drawn by blower 30 through the evaporator 36 is cooled and the cooled air is furnished to supply duct 22 by blower 30. A condenser section 38 dissipates heat from the refrigerant, all in a now conventional manner.

HVAC unit 12 includes an "economizer" arrangement 40 for introducing some amounts of ambient air from outside the building 16 into the HVAC system 10. An ambient air inlet 42 is located beneath an economizer hood 44 which extends along the end 46 of HVAC unit 12, and an inlet air filter 48 is placed at the air inlet 42. An inlet damper 50 controls the volume of air admitted into the return section 24 by the economizer arrangement 40. A portion of the return air entering the return section 24 from the return duct 26 is exhausted to the outside of the building 16 through an exhaust outlet 52 and an exhaust damper 54, usually assisted by an exhaust fan 56, here shown placed outside the exhaust outlet 52. During a heating cycle, the temperature of the return air is somewhat elevated over the temperature of the ambient air outside the building 16, and excess heat from the exhausted return air merely is dissipated into the ambient air. During a cooling cycle, the temperature of the return air is somewhat lower than the temperature of the ambient air, and the cool air merely is dissipated into the ambient air. Thus, during both a heating cycle and a cooling cycle, some of the energy utilized by HVAC unit 12 to treat air processed in the HVAC unit 12 merely is dissipated into the ambient air outside the building, resulting in wasted energy.

Figure 3:
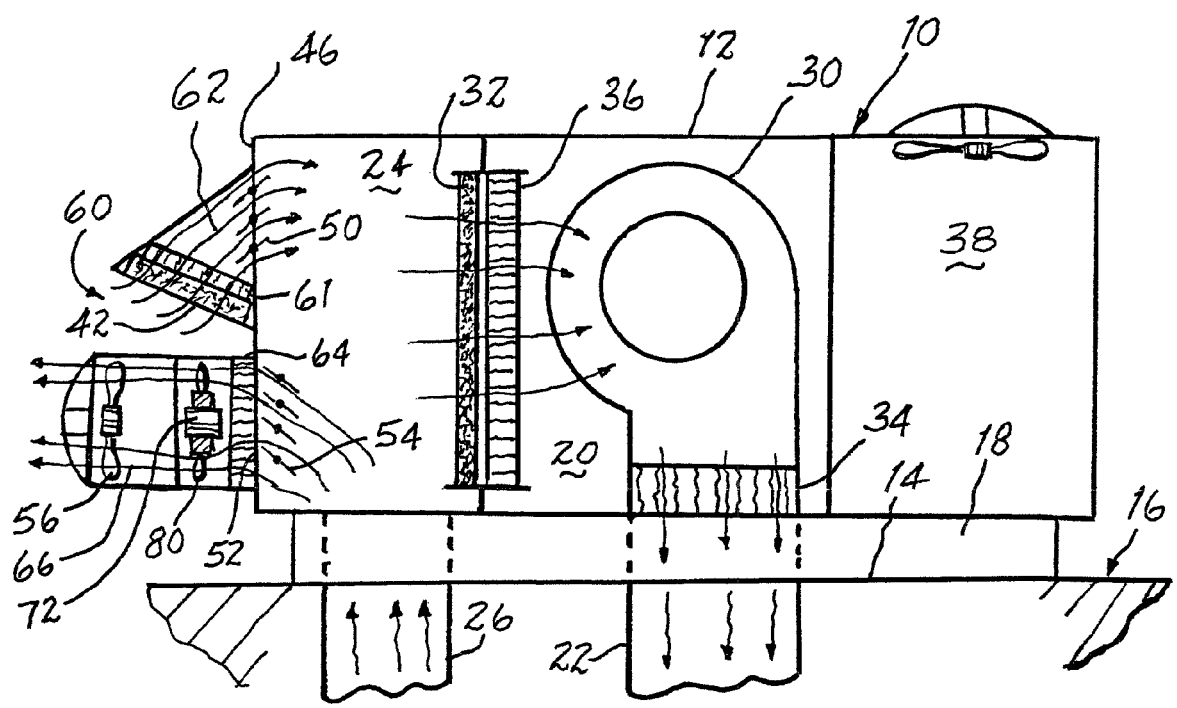
FIG. 3 is a largely diagrammatic side elevational cross-sectional view of the HVAC unit modified in accordance with the present invention.
Figure 4:
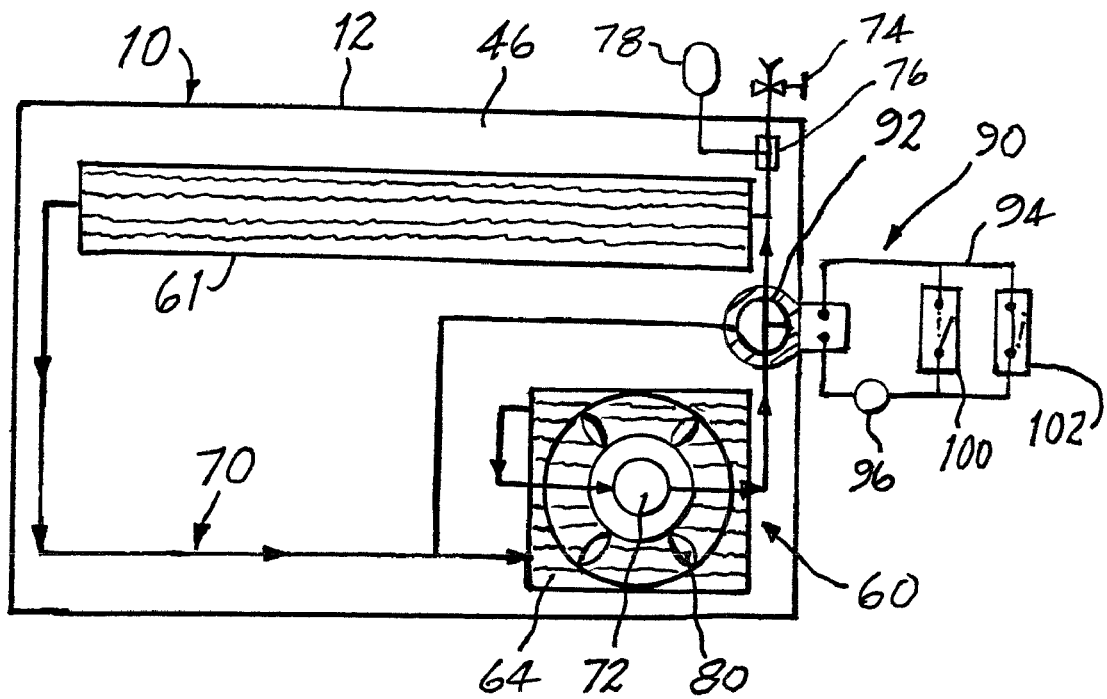
FIG. 4 is a largely diagrammatic end elevational cross-sectional view of the modified unit.
Figure 5:
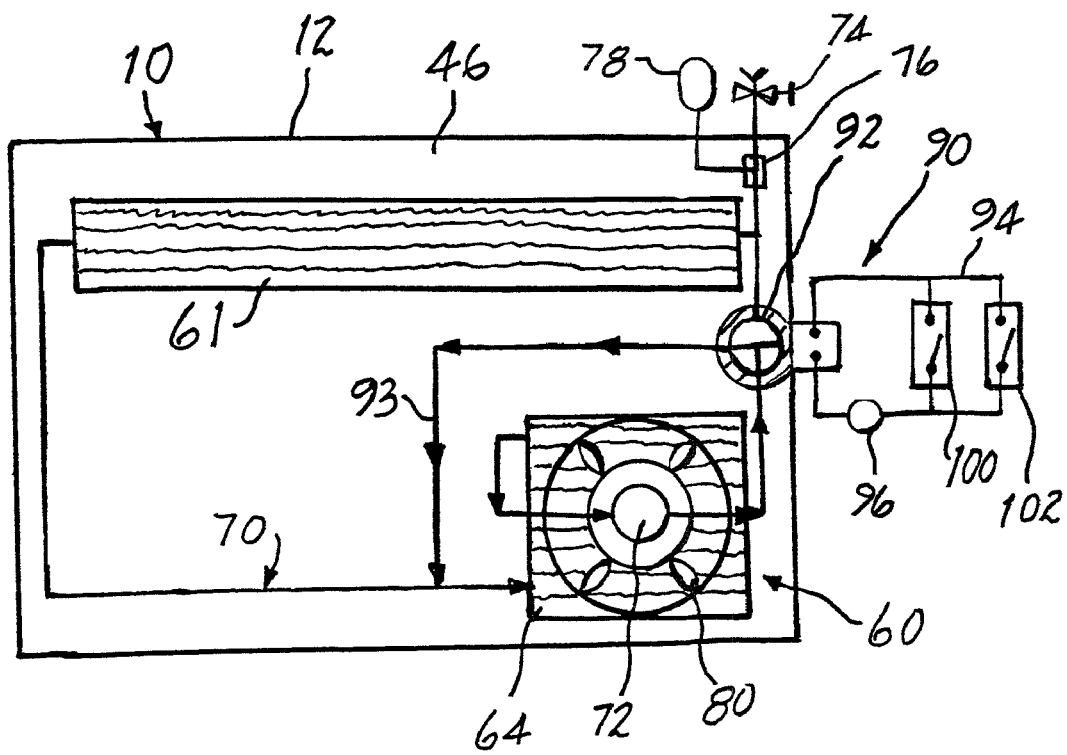
FIG. 5 is a view similar to FIG. 4 and showing component parts in another operating position.

Turning now to FIGS. 3 through 5, the present invention provides an improvement that recovers energy which otherwise would be dissipated as described immediately above. To that end, HVAC unit 12 is modified to include an energy recovery system 60, as follows: An intake air heat exchanger 61 is mounted in HVAC unit 12, placed in intake airstream 62 which flows from inlet 42 through inlet damper 50 and into return section 24, and an exhaust air heat exchanger 64 is mounted in the HVAC unit 12, placed in exhaust airstream 66 which flows through exhaust damper 54 to pass through exhaust outlet 52. A fluid circuit 70 is interconnected between the intake air heat exchanger 61 and the exhaust air heat exchanger 64 and includes a heat exchange fluid pump 72 for circulating a heat exchange fluid through the fluid circuit 70 and through the heat exchangers 61 and 64. A suitable heat exchange fluid is water containing approximately thirty percent glycol. Fluid circuit 70 is filled through a filler valve 74, and includes a sight-glass 76 and an expansion chamber 78.

An air turbine 80 is mounted on the HVAC unit 12, placed, preferably, in the exhaust airstream 66 so as to be driven by the exhaust airstream 66 as return air is exhausted through the exhaust outlet 52. Air turbine 80 is coupled with pump 72 such that upon being driven by the exhaust airstream 66 the air turbine 80, in turn, drives the pump 72 to circulate the heat exchange fluid within fluid circuit 70 between the intake air heat exchanger 61 and the exhaust air heat exchanger 64, thereby effecting the transfer of heat from one to the other of the intake airstream 62 and the exhaust airstream 66. That is, should HVAC unit 12 be operating in a heating cycle, return air entering the return section 24 from return duct 26 and being exhausted along exhaust airstream 66 will be warmer than ambient air introduced into return section 24 along intake airstream 62, and heat will be transferred from exhaust airstream 66 to intake airstream 62 to pre-heat incoming ambient air prior to that incoming ambient air being moved by blower 30 through heat exchanger 34. Thus, heat which otherwise would be dissipated to the ambient air outside building 16 now is recovered and used to reduce the heating load on heat exchanger 34, resulting in the conservation of energy. Should HVAC unit 12 be operating in a cooling cycle, return air entering the return section 24 from return duct 26 and being exhausted along exhaust airstream 66 will be cooler than ambient air introduced into return section 24 along intake airstream 62, and heat will be transferred from intake airstream 62 to exhaust airstream 66 to pre-cool incoming ambient air prior to that incoming ambient air being moved through evaporator 36. Thus, some heat which otherwise would be required to be removed from the incoming ambient air by evaporator 36 now is removed at intake air heat exchanger 61 so that the cooling load on evaporator 36 is reduced, resulting in the conservation of energy.

Since pump 72 is operated by air turbine 80 which, in turn, is operated by the flow of air in exhaust airstream 66, the circulation of heat exchange fluid within fluid circuit 70 is related directly to the volumetric flow of air in exhaust airstream 66 so that operation of the energy recovery system 60 is regulated automatically in accordance with the volumetric airflow at the economizer arrangement 40, without the requirement for any additional or elaborate control systems.

During seasonal climate changes there may be periods when the differential between the temperature of the ambient air outside building 16 and the temperature of processed air inside building 16 is such that it becomes impractical to continue the circulation of heat exchange fluid throughout the entire fluid circuit 70. Accordingly, energy recovery system 60 is provided with a control system 90 for controlling the circulation of heat exchange fluid through fluid circuit 70 in accordance with the temperature of ambient air outside building 16. Where the temperature of the ambient air outside building 16 is within a predetermined range of temperature such that there is no requirement for either heating or cooling the processed air inside building 16, energy recovery system 60 is operated in a first mode wherein the heat exchange fluid in fluid circuit 70 is diverted into a path which provides less resistance to the flow of heat exchange fluid through the fluid circuit 70, preferably by bypassing at least one of the intake air heat exchanger 61 and the exhaust air heat exchanger 62, while allowing the air turbine 80 and pump 72 to continue to operate in response to exhaust airstream 66, but with a lesser operating load. Where the temperature of the ambient air outside building 16 is outside the predetermined range of temperature, requiring either heating or cooling of the processed air inside building 16, energy recovery system 60 is operated in a second mode wherein the heat exchange fluid is circulated through both the intake air heat exchanger 61 and the exhaust air heat exchanger 62. The predetermined range of temperature is related to the desired air temperature within building 16. As such, the preferred predetermined range of temperature is from a lower temperature of about 45° F. to an upper temperature of about 65° F.

As seen in FIGS. 4 and 5, control system 90 includes an electrically operated control valve, shown in the form of diverter valve 92 which is operated between a configuration wherein the flow of heat exchange fluid through fluid circuit 70 passes through both the intake air heat exchanger 61 and the exhaust air heat exchanger 62, as illustrated in FIG. 4, and a configuration wherein the flow of heat exchange fluid is diverted to a path 93 which bypasses the intake air heat exchanger 61 such that the heat exchange fluid passes through the exhaust air heat exchanger 62, but not through the intake air heat exchanger 61, as illustrated in FIG. 5. In this manner, resistance within the fluid circuit 70 is reduced with a concomitant reduction in the load on air turbine 80 and pump 72, while allowing both the air turbine 80 and the pump 72 to operate continuously, without interruption.

Diverter valve 92 is configured to be retained normally in the configuration illustrated in FIG. 5 and to be operated for placement into the configuration illustrated in FIG. 4 in response to the application of electrical energy. To that end, control system 90 includes an electrical circuit 94 between a source 96 of electrical energy and diverter valve 92, and two temperature responsive electrical switches 100 and 102 connected within the electrical circuit 94 each in series with source 96 and diverter valve 92, and in parallel with one-another. Switches 100 and 102 are arranged so as to be operated in response to the temperature of the ambient air outside building 16, as follows: With the temperature of the ambient air being within the predetermined range of temperature, both switches 100 and 102 will remain open and diverter valve 92 will remain in the configuration illustrated in FIG. 5. Should the ambient air temperature drop below the lower temperature, switch 100 will close, connecting the source 96 of electrical energy to diverter valve 92, and diverter valve 92 will be operated for placement into the configuration illustrated in FIG. 4. Likewise, should the ambient air temperature rise above the upper temperature, switch 102 will close and diverter valve 92 will be operated for placement into the configuration illustrated in FIG. 4.

Energy recovery system 60, as described in detail above, is comprised of component parts which are simple in construction and readily installed without the necessity for elaborate or specialized plumbing or electrical parts and skills. As such, modification of an existing, installed HVAC unit is accomplished readily, as well as adaption to new HVAC units. In the illustrated embodiments, economizer arrangement 40 of HVAC unit 12 is accessed readily and modification is accomplished simply by mounting intake air heat exchanger 61 so as to be placed within intake airstream 62, removing exhaust fan 56 and mounting exhaust air heat exchanger 64 and integrated air turbine 80 and pump 72 so as to be placed within exhaust airstream 66. Exhaust fan 56 then is replaced, as shown. Relatively simple plumbing completes the required fluid circuit 70, and the control system 90 is mounted upon the HVAC unit 12 with ease. Source 96 of electrical energy may be in the form of a low-voltage transformer readily connected to a standard electrical outlet without the necessity for specialized electrical power circuits. Thus, modification is accomplished with ease and without the necessity for highly specialized equipment and skills.

It will be seen that the present invention attains all of the objects and advantages summarized above, namely: Provides improvements in both apparatus and method for conserving energy in the operation of an HVAC system; conserves energy in an HVAC system in which air is supplied by the system to a building through an ambient air intake airstream and is exhausted from the building through an exhaust airstream; enables a simplified installation of the several components of an improvement to an HVAC system for accomplishing energy conservation in either an existing, installed HVAC system or a new HVAC system; provides apparatus and method for modifying an HVAC system to conserve energy during operation of the HVAC system, without the necessity for extensive plumbing and electrical connections in order to complete an effective modification; accomplishes simplified, more efficient modes of operation of an HVAC system adapted to conserve energy during such operation; requires less complex, readily installed components for the modification of an HVAC system to attain conservation of energy during operation of the system; provides improvements which attain energy conservation with reliable operation over an extended service life.

It is to be understood that the above detailed description of preferred embodiments of the invention are provided by way of example only. Various details of design, construction and procedure may be modified without departing from the true spirit and scope of the invention, as set forth in the appended claims.

The embodiments of the invention in which an exclusive property or privilege is claimed are defined as follows:

1. An improvement for conserving energy in an HVAC system in which ambient air is supplied by the system to a building through an ambient air intake airstream and is exhausted from the building through an exhaust airstream, and heat is transferred between the intake airstream and the exhaust airstream by a heat exchange fluid circulated through a fluid circuit by a heat exchange fluid pump between an intake air heat exchanger located in the intake airstream and an exhaust air heat exchanger located in the exhaust airstream, the improvement comprising:

an air turbine placed in one of the intake airstream and the exhaust airstream for being driven by a corresponding airstream, the air turbine being coupled with the heat exchange fluid pump such that upon being driven by the corresponding airstream, the air turbine will, in turn, drive the heat exchange fluid pump in proportion to a volumetric flow of the corresponding airstream to circulate the heat exchange fluid between the intake air heat exchanger and the exhaust air heat exchanger and thereby effect the transfer of heat from one to the other of the intake airstream and the exhaust airstream and a concomitant conservation of energy in the HVAC system.

2. The improvement of claim 1 wherein the air turbine is placed in the exhaust airstream.

3. The improvement of claim 1 including:

a control system for controlling the circulation of the heat exchange fluid through the fluid circuit such that the heat exchange fluid is circulated in either one of a first mode wherein the heat exchange fluid is diverted so as to bypass at least one of the intake air heat exchanger and the exhaust air heat exchanger in response to ambient air temperature outside the building being within a predetermined range of temperature, and a second mode wherein the heat exchange fluid is circulated through both the intake air heat exchanger and the exhaust air heat exchanger when the ambient air temperature is outside the predetermined range of temperature, while the air turbine and the heat exchange fluid pump continue to operate in response to the corresponding airstream.

4. The improvement of claim 3 wherein the predetermined range of temperature is about 45° F. to about 65° F.

5. The improvement of claim 3 wherein the predetermined range of temperature extends between a lower temperature and an upper temperature, and the control system includes:
at least one electrically operated control valve in the fluid circuit, the control valve being configured for operation between a first configuration wherein the heat exchange fluid will be circulated through the fluid circuit in the first mode, and a second configuration wherein the heat exchange fluid will be circulated through the fluid circuit in the second mode; and
an electrical circuit for connecting a source of electrical energy to the control valve for operating the control valve between the first configuration and the second configuration.

6. The improvement of claim 5 including:
first and second temperature responsive electrical switches connected within the electrical circuit, the first temperature responsive electrical switch being configured for connecting the source of electrical energy to the control valve when the ambient air temperature is no higher than the lower temperature, and the second temperature responsive electrical switch being configured for connecting the source of electrical energy to the control valve when the ambient air temperature is no lower than the upper temperature, such that the control valve will be in the first configuration when the ambient air temperature is within the predetermined range of temperature and will be in the second configuration when the ambient air temperature is outside the predetermined range of temperature.

7. The improvement of 6 wherein each of the first and second temperature responsive electrical switches is connected in series with the source of electrical energy and the control valve, and the first and second temperature responsive electrical switches are connected in parallel with one another.

8. The improvement of claim 6 wherein the predetermined range of temperature is about 45° F. to about 65° F.

9. The improvement of claim 7 wherein the air turbine is placed in the exhaust airstream.

10. The improvement of claim 9 wherein the predetermined range of temperature is about 45° F. to about 65° F.

11. A method for conserving energy in an HVAC system in which ambient air is supplied by the system to a building through an ambient air intake airstream and is exhausted from the building through an exhaust airstream, and heat is transferred between the intake airstream and the exhaust airstream by a heat exchange fluid circulated through a fluid circuit by a heat exchange fluid pump between an intake air heat exchanger located in the intake airstream and an exhaust air heat exchanger located in the exhaust airstream, the method comprising:
placing an air turbine in one of the intake airstream and the exhaust airstream for being driven by a corresponding airstream; and
coupling the air turbine with the heat exchange fluid pump such that upon being driven by the corresponding airstream, the air turbine will, in turn, drive the heat exchange fluid pump in proportion to a volumetric flow of the corresponding airstream to circulate the heat exchange fluid between the intake air heat exchanger and the exhaust air heat exchanger and thereby effect the transfer of heat from one to the other of the intake airstream and the exhaust airstream and a concomitant conservation of energy in the HVAC system.

12. The method of claim 11 wherein placing the air turbine includes placing the air turbine in the exhaust airstream.

13. The method of claim 10 including controlling the circulation of the heat exchange fluid through the fluid circuit such that the heat exchange fluid is circulated in either one of a first mode wherein the heat exchange fluid is diverted so as to bypass at least one of the intake air heat exchanger and the exhaust air heat exchanger in response to ambient air temperature outside the building being within a predetermined range of temperature, and a second mode wherein the heat exchange fluid is circulated through both the intake air heat exchanger and the exhaust air heat exchanger when the ambient air temperature is outside the predetermined range of temperature, while the air turbine and the heat exchange fluid pump continue to operate in response to the corresponding airstream.

14. The method of claim 13 wherein placing the air turbine includes placing the air turbine in the exhaust airstream.

15. The method of claim 13 wherein the predetermined range of temperature is about 45° F. to about 65° F.

* * * * *